(No Model.) 2 Sheets—Sheet 1.

G. W. ODELL & H. G. HOPPER.
PICKET FENCE MACHINE.

No. 390,983. Patented Oct. 9, 1888.

Witnesses:
P. M. Hulbert.
Jas. Whittemore

Inventors:
George W. Odell
Henry G. Hopper.
By Thos. S. Sprague & Son.
Att'y.

(No Model.) 2 Sheets—Sheet 2.

G. W. ODELL & H. G. HOPPER.
PICKET FENCE MACHINE.

No. 390,983. Patented Oct. 9, 1888.

Witnesses:
P. M. Hulbert.
Jas. Whittemore.

Inventors:
George W. Odell,
Henry G. Hopper.
By Thos. S. Sprague & Son.
Att'y.

UNITED STATES PATENT OFFICE.

GEORGE W. ODELL AND HENRY G. HOPPER, OF RANKIN, MICHIGAN; SAID HOPPER ASSIGNOR TO THE CURTIS FENCE MACHINE COMPANY, OF FLINT, MICHIGAN.

PICKET-FENCE MACHINE.

SPECIFICATION forming part of Letters Patent No. 390,983, dated October 9, 1888.

Application filed March 6, 1888. Serial No. 266,312. (No model.)

*To all whom it may concern:*

Be it known that we, GEORGE W. ODELL and HENRY G. HOPPER, citizens of the United States, residing at Rankin, in the county of Genesee and State of Michigan, have invented certain new and useful Improvements in Picket-Fence Machines, of which the following is a specification, reference being had therein to the accompanying drawings.

This invention relates to certain new and useful improvements in fence-machines; and the invention consists in the peculiar construction and arrangement of different parts, all as more fully hereinafter described and claimed, and shown in the accompanying drawings, in which—

Figure 1:
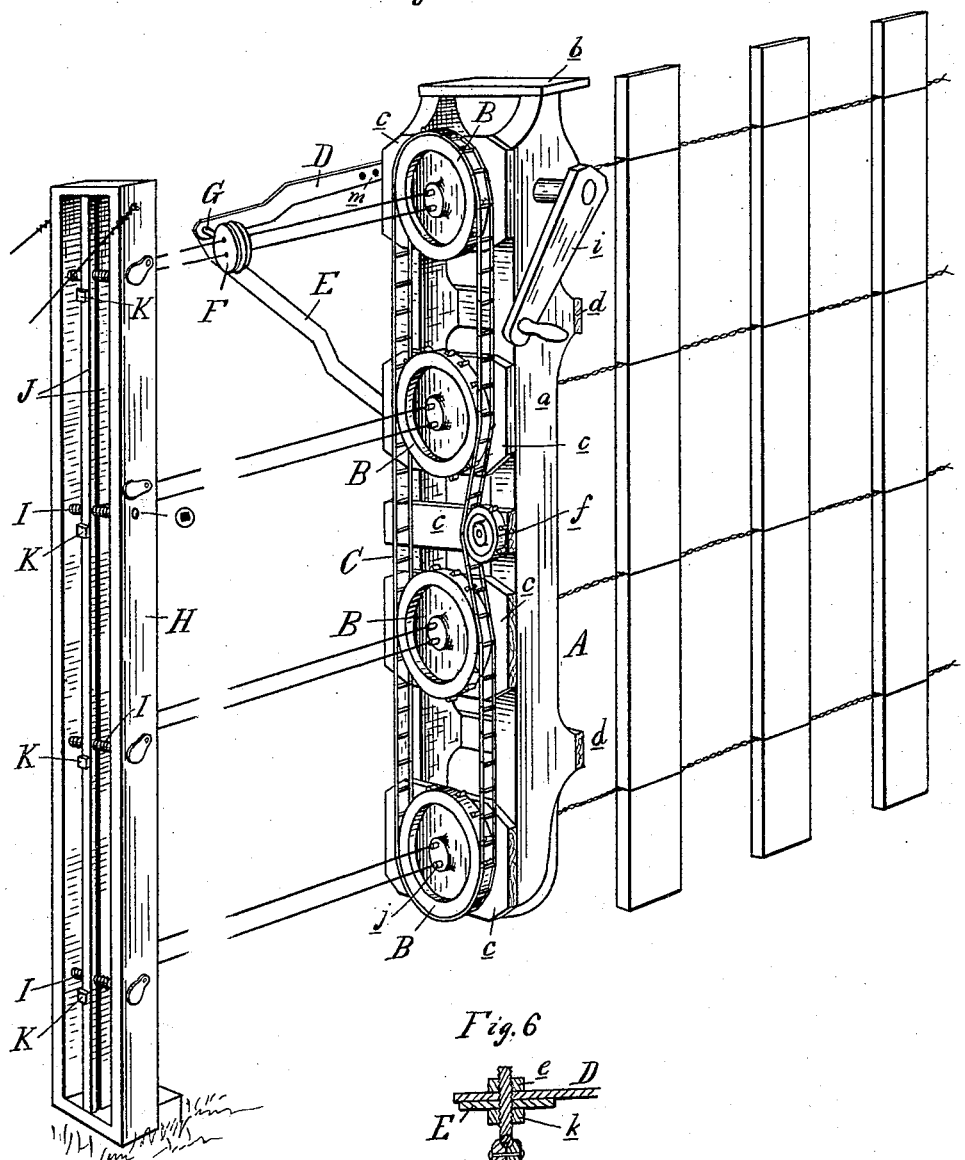
Figure 6:
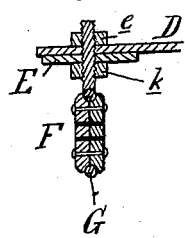
Figure 2:
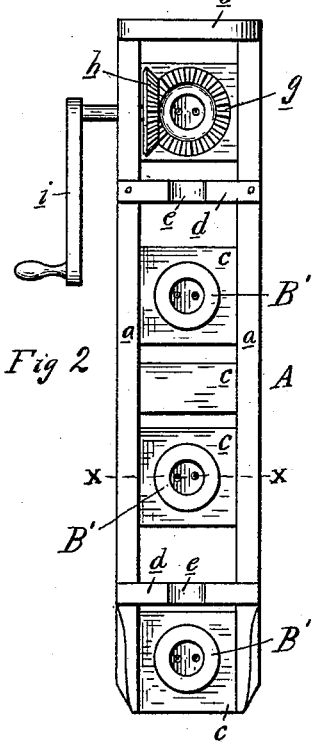
Figure 3:
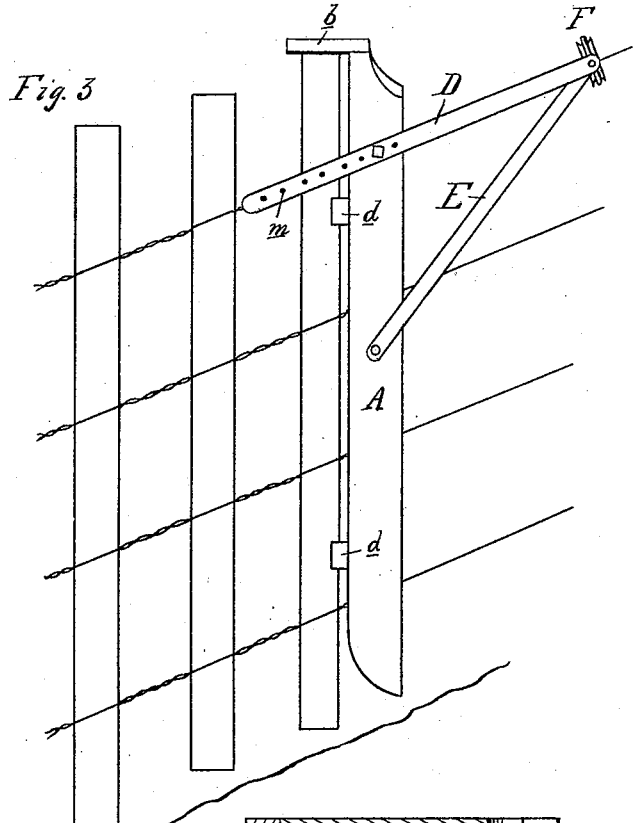
Figure 4:
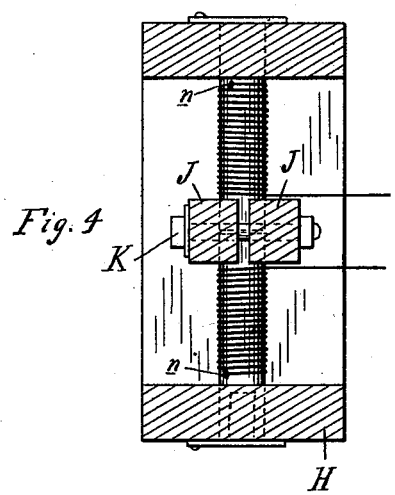
Figure 5:
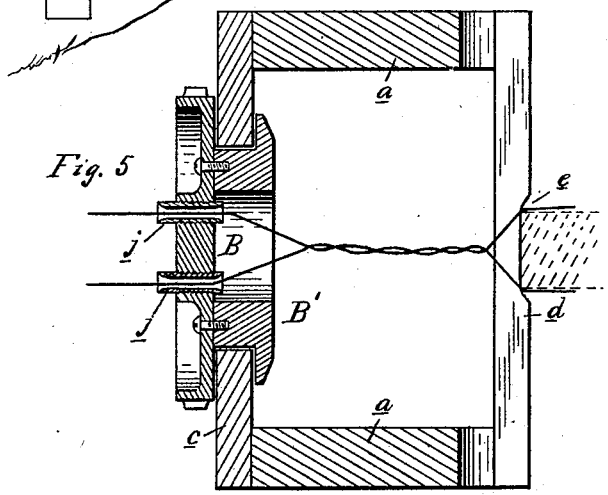

Figure 1 is a perspective view of our improved machine in operation in connection with the wire-tension. Fig. 2 is a rear elevation. Fig. 3 is a side elevation illustrating the operation of the outrigger in going uphill. Fig. 4 is a horizontal section through the tension-bar. Fig. 5 is a horizontal section through the machine on line $x\ x$ in Fig. 2. Fig. 6 is a horizontal section through the outrigger-traveler.

A is the frame, consisting of the vertical sides $a$, the guide-board $b$, fastened on the top and projecting sufficiently to the rear to adjust thereby the height of the picket, the cross-cleats $c$ on the front to form bearings for the rotary twisters, and the cross-cleats $d$, fastened on the back and provided with notches $e$ to engage the edge of the picket.

B are the rotary twisters, journaled in the cross-cleats $c$, and provided with peripheral sprocket-teeth to engage with the sprocket-chain C, which passes around said twisters and is held in engagement with the central twisters by an idler-sprocket, $f$. The upper twister carries on its rear a bevel-wheel, $g$, which meshes with a bevel-wheel, $h$, journaled in one side of the frame and provided with a suitable crank, $i$, to impart motion thereto by hand. Steel bushings $j$ are preferably secured in the eyes of the twisters to prevent them from wearing out.

The twister-wheel is made in the shape of a disk, and has detachably secured to its rear the hollow hub B', provided with circumferential groove to form a bearing and with a large central aperture to give free passage to the wires. By this construction the friction of the device on the wires is greatly decreased, and the parts are more easily mounted and dismounted for repair.

D and E are two bars secured to the side of the frame which is opposite to the crank, and these bars form a rigid outrigger, to which is secured the guide-wheel F, which rides on the top wires in advance of the machine. The guide-wheel F is suitably apertured for the passage of the wires, and is loosely secured in the eye of an eyebolt, G, the shank of which pivotally connects together the outer ends of the bars D and E, and is secured thereto by the nuts $k$ and $l$. The inner ends of the bars D and E are pivotally secured to the side of the frame, and one of them is provided with a series of adjusting-holes, $m$, all so arranged that the vertical position of the guide-wheel F may thereby be adjusted up or down for the purpose of holding the frame of the fence-machine in perpendicular position, which is especially difficult to maintain in going up or down hill, Fig. 3 showing the adjustment of the device as going uphill.

The tension of the wire is produced by means of the tension device shown in Fig. 1 and in cross-section in Fig. 4, and consists of the frame H, provided with suitable means for anchoring it to the ground, the transverse shafts I, journaled in said frame, and the clamping-strips J, applied to the vertical center of the shaft I. These clamping-strips embrace all the shafts upon their opposite sides, and have the clamping-bolts K—two for each shaft—to clamp each shaft with the necessary force to give the required tension to the wires. Each shaft is provided with suitable holes, $n$, to secure the ends of the wires, and is socketed at one end to apply a crank for winding up the wires.

The mode of constructing the fence is substantially the same as with other machines of this class, and will be readily understood from the special description of the different parts.

What we claim as our invention is—

1. In a fence-machine, the combination, with the frame or casing, of the bars D E, pivotally secured to the side of the casing and provided with adjusting-holes $m$, the eyebolt G, pivotally connecting the free ends of said bars, the guide-wheel F, journaled in said eyebolt, and the nuts $l$ $k$, all arranged to operate substantially as described.

2. In a fence-machine, the frame A, consisting of the vertical sides $a$, guide-board $b$, secured to the upper end of said sides and extended rearward, as described, the cross-cleats $c$ on the front, and the cross-cleats $d$ on the back of the sides $c$ and formed with notches $e$, substantially as and for the purpose specified.

In testimony whereof we affix our signatures, in presence of two witnesses, this 12th day of January, 1888.

GEORGE W. ODELL.
HENRY G. HOPPER.

Witnesses:
N. R. SMITH,
P. M. HULBERT.